M. M. PALMER.
IMITATION GRASSHOPPER AND METHOD OF MAKING THE SAME.
APPLICATION FILED APR. 5, 1917.

1,248,390.

Patented Nov. 27, 1917.

Inventor
Marion M. Palmer
by Hazard & Miller
Att'ys.

UNITED STATES PATENT OFFICE.

MARION M. PALMER, OF PASADENA, CALIFORNIA.

IMITATION GRASSHOPPER AND METHOD OF MAKING THE SAME.

1,248,390.  Specification of Letters Patent.  Patented Nov. 27, 1917.

Application filed April 5, 1917. Serial No. 160,035.

*To all whom it may concern:*

Be it known that I, MARION M. PALMER, a citizen of the United States, residing at Pasadena, in the county of Los Angeles and State of California, have invented new and useful Improvements in Imitation Grasshoppers and Methods of Making the Same, of which the following is a specification.

This invention relates to a fishing fly and method of making the same.

It has been discovered that certain species of fish are particularly fond of grasshoppers, and with this idea in view it is the principal object of this invention to provide a fishing fly formed to closely resemble a grasshopper and to be mounted in a concealed manner upon the shank of a fishing hook.

Another object of this invention is to provide a fishing fly of the above formation which is constructed of material impervious to moisture and which will cause the fly to float upon the surface of the water in an upright manner so that a life-like appearance will be produced.

Another object of this invention is to provide a fly which is formed of inexpensive material adapted to be easily obtained and which may be readily utilized in constructing the imitation insects.

It is a further object of this invention to provide an article of the above character which may be firmly assembled and may be re-used without having been damaged by the action of the fish taking the hook.

Other objects will appear hereinafter.

The invention is illustrated, by way of example, in the accompanying drawings in which.

Figure 1:
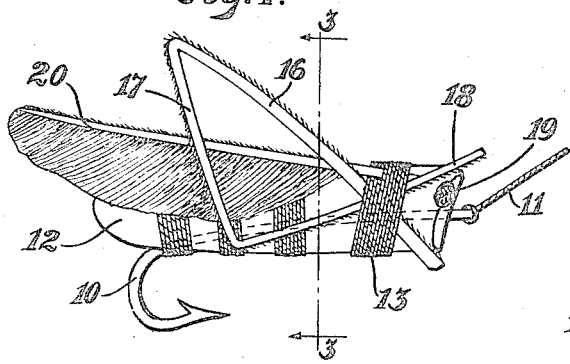
Figure 1 is a view in side elevation illustrating one of the devices formed to represent a full grown grasshopper.
Figure 4:
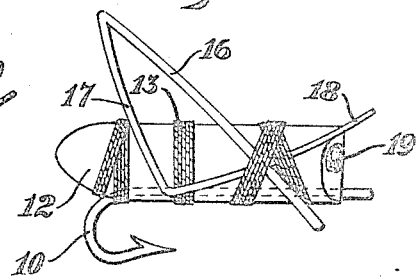
Fig. 4 is a view in side elevation illustrating the device formed to represent a young grasshopper suitable for use with small hooks.
Figure 2:
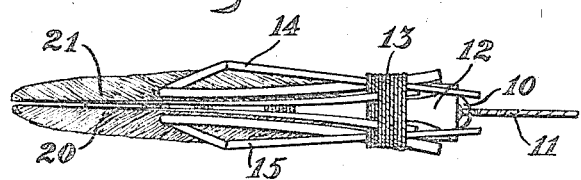
Fig. 2 is a view in plan illustrating the fly disclosed in Fig. 1.
Figure 5:
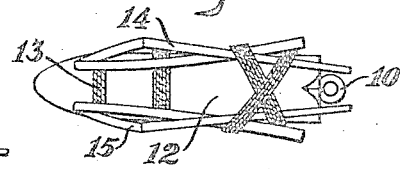
Fig. 5 is a view in plan illustrating the fly shown in Fig. 4.
Figure 3:
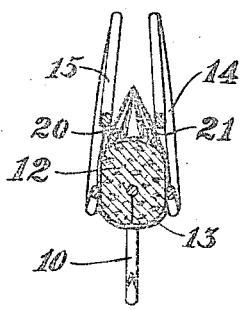
Fig. 3 is a view in transverse section as seen on the line 3—3 of Fig. 1 and particularly discloses the manner in which the shank of the hook is embedded within the body of the fly.
Figure 6:
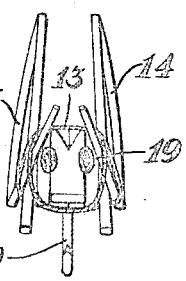
Fig. 6 is a view in front elevation adapted to further disclose the appearance of the grasshopper shown in Fig. 4.

Referring more particularly to the drawings, 10 indicates a fishing hook which is adapted to be suspended from an invisible leader 11. Mounted upon the shank of the hook is a cork body member 12 which is formed to represent the body portion of a grasshopper. Due to the peculiar brown coloring of cork, this body will be substantially the shade of coloring of the body of the insect. As particularly shown in Fig. 3, a longitudinal split is made substantially the length of the cork body member and the shank of the hook is embedded therein so that the hook portion will extend downwardly and forwardly beneath the body of the grasshopper and the point of the hook will terminate substantially beneath the center of the body. After the hook has been placed in position, silk thread 13 is wrapped around the body in a manner to close the split and secure the hook. Legs 14 and 15 are then fastened upon the opposite sides of the body. These legs are formed from the shafts of feathers which are prepared by cutting the barbs off a short distance from the shaft. This will cause short barbs to project from the shaft and correspond with the barbs which normally project from the legs of the grasshopper. As here shown, the shaft of the feather is formed with an inclined length 16 representing the upper joint of the leg, and a downwardly extending length 17 representing the lower section of the leg. Another length of the shaft extends forwardly along the side of the body to form an antenna 18 which is also fitted with barbs. The head forming a part of the body is painted with a mixture of varnish and bronze paint to form eyes 19 which appear very much like the eyes of a live grasshopper. In the form shown in Fig. 1, wings 20 and 21 are provided. These wings are formed from the ends of feathers and produce a life-like imitation of the original. In the form shown in Fig. 4, the wings are dispensed with and this causes the model to appear as a young grasshopper. However, the other features of construction are the same in both models. When the device has been entirely assembled it is treated with a coat of shellac which will render the entire structure impervious to moisture.

In using the fly here shown, it is preferably fastened to an invisible leader and suspended from a fishing line. When it is cast upon the water it will remain in an upright position and appear to be floating. When in this position the hook will extend downwardly, due to the weight of the depending portion of the hook. The fish will be attracted by this bait and, due to its life-like appearance and action, will make an effort to catch it, thereby becoming caught by the hook.

It will thus be seen that the device here disclosed may be easily constructed from simple and inexpensive parts and will provide a grasshopper of life-like appearance.

While I have shown the preferred construction of my fishing fly as now known to me, it will be understood that various changes in the combination, construction, and arrangement of parts may be made by those skilled in the art without departing from the spirit of my invention.

I claim:

1. The method of making a fishing fly in imitation of a grasshopper which consists in forming a body portion of buoyant material, preparing legs from the shafts of feathers by cutting the barbs from the feathers a short distance from the shafts and bending the shafts to form triangular members having overlapping ends, fastening the shafts in place upon the body in a manner to represent the legs of a grasshopper, and preparing two short lengths of feathers and fastening the feathers upon the back of the body member to represent the wings of a grasshopper.

2. A fishing fly in imitation of a grasshopper comprising a buoyant body, a fishing hook having its shank embedded in the body and the hook extending downwardly and forwardly beneath the body, sections of feather shafts bent to form triangles, the ends of the shafts crossing each other and extending forwardly and said shafts being secured to the body by wrapping with thread, and wings formed from feathers and fastened upon the body by wrapping with thread.

3. A fishing fly in imitation of a grasshopper comprising a buoyant body, a fishing hook having its shank embedded in the body and the hook extending downwardly and forwardly beneath the body, and sections of feather shafts bent to form triangles, the ends of the shafts crossing each other and extending forwardly and said shafts being secured to the body by wrapping with thread.

4. A fishing fly in imitation of a grasshopper comprising an elongated body portion formed of cork; one end of which is rounded and the opposite end of which is substantially square with obliquely inclined vertical edges; said body being formed with a longitudinal slit along one side; a fishing hook disposed with its shank within the slit of the body and thereby concealed, legs formed of lengths of feather shafts from which the barbs have been trimmed so that short portions of the barbs will extend outwardly from the shafts; said shafts thus prepared being bent to form triangular members; the ends of the shafts crossing each other and extending forwardly along the sides of the body; one end upwardly and outwardly therefrom and the opposite end downwardly and outwardly therefrom; wing members formed of short lengths of feathers; the barbs from one side of the shaft being removed; and cords by which the wing members and leg members are secured to the opposite sides of the body.

In testimony whereof I have signed my name to this specification.

MARION M. PALMER.

Copies of this patent may be obtained for five cents each, by addressing the "Commissioner of Patents, Washington, D. C."